US010542157B1

United States Patent
Ostberg

(10) Patent No.: US 10,542,157 B1
(45) Date of Patent: Jan. 21, 2020

(54) COMMUNICATIONS RECOMMENDATION ASSISTANT

(71) Applicant: NOKIA SOLUTIONS AND NETWORKS OY, Espoo (FI)

(72) Inventor: Brian Ostberg, Wheaton, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/130,233

(22) Filed: Sep. 13, 2018

(51) Int. Cl.
| *H04M 11/00* | (2006.01) |
| *H04M 15/00* | (2006.01) |
| *H04W 4/50* | (2018.01) |
| *H04W 4/029* | (2018.01) |

(52) U.S. Cl.
CPC ........... *H04M 15/41* (2013.01); *H04M 15/58* (2013.01); *H04W 4/029* (2018.02); *H04W 4/50* (2018.02); *H04M 2215/0164* (2013.01); *H04M 2215/0188* (2013.01)

(58) Field of Classification Search
CPC .......... H04W 4/24; H04W 4/02; H04W 64/00
USPC ............... 455/405, 406, 408, 456.1
See application file for complete search history.

(56) References Cited

U.S. PATENT DOCUMENTS

| 2006/0258339 | A1* | 11/2006 | Connelly | ............... | H04M 15/41 |
| | | | | | 455/414.1 |
| 2012/0214441 | A1* | 8/2012 | Raleigh | ............ | G06Q 10/06375 |
| | | | | | 455/406 |
| 2012/0278076 | A1 | 11/2012 | Lloyd et al. | | |
| 2013/0212190 | A1 | 8/2013 | Patil | | |
| 2014/0052680 | A1 | 2/2014 | Nitz et al. | | |
| 2015/0205784 | A1 | 7/2015 | Mese et al. | | |
| 2016/0019402 | A1 | 1/2016 | Khandelwal | | |
| 2016/0173421 | A1 | 6/2016 | Alshinnawi et al. | | |
| 2016/0330328 | A1* | 11/2016 | Garg | .................... | H04M 15/41 |

OTHER PUBLICATIONS

Automated Text Messages; https://simpletexting.com/automated-text-messages/; 8 pgs.; Copyright 2018 SimpleTexting.com; 1815 Purdy Avenue, Miami Beach, FL 33139.

* cited by examiner

*Primary Examiner* — Temica M Beamer
(74) *Attorney, Agent, or Firm* — McCracken & Gillen LLC

(57) ABSTRACT

A telephone communication network analyzes network usage data to find patterns in communications by user of a device in the network. The patterns are analyzed and associated with signals, for example, location, time of day and day of week which are then used to suggest recommended actions to the user. The network usage data may include call data records (CDRs) and Per Call Measurement Data (PCMD), for example. Network elements may send notifications to a client application on the user device. Network elements may also send communication patterns to the client application. Communications analyzed by the network may include voice calls, text messages and IP sessions.

20 Claims, 3 Drawing Sheets

COMMUNICATIONS RECOMMENDATION ASSISTANT

TECHNICAL FIELD

Various example embodiments relate generally to data analytics and machine learning and more particularly to an intelligent communications system for providing communication recommendations to a user.

BACKGROUND

Many online services, such as Amazon, Netflix, YouTube and others, use recommendation services to anticipate what a consumer may want to see, and provide suggestions to make anticipated choices more readily available, thus enhancing and simplifying consumers' lives. Consumers have become conditioned to such recommendation systems and the implicit quid-pro-quo.

Meanwhile, telephony consumers are making tens or even hundreds of communications per day, via messages and voice calling. A significant portion of these conversations fall into patterns that reflect the cadence of the consumer's daily personal, social, and work lives, patterns that often go unleveraged. Consumers may need to re-initiate these habitual conversations on a continual basis, and often with repetitive and troublesome overhead which includes, for example, retyping similar text messages into a messaging application on their cell phone.

In addition, telecommunication network providers collect detailed information per day about the telephony usage of their subscribers, but have not as yet leveraged it to any significant degree.

SUMMARY

Example embodiments encompass a recommendation system that uses the data collected by wireless communication network providers to enhance the communication usage of mobile device users. In an embodiment, a computer-implemented method in a telephony communications network comprising a plurality of network elements includes steps of receiving call or session specific data associated with at least one user device from one or more network elements, said call or session specific data comprising information about communications in the telephony communications network associated with at least one user device; analyzing the call or session specific data to determine one or more communication patterns, a communication pattern derived from a plurality of communications associated with a real-time signal; and provisioning the one or more communication patterns in a recommendation network element, said recommendation network element using said one or more communication patterns to implement a communication notification to the at least one user device upon an occurrence of the associated real-time signal.

In another embodiment, an apparatus includes network means for providing a telephony communication network, including a non-transitory storage means and one or more processing means, said network means configured to receive call or session specific data associated with at least one user means, said call or session specific data comprising information about communications in the telephony communications network associated with at least one user means; analyze the call or session specific data to determine one or more communication patterns, a communication pattern derived from a plurality of communications associated with a real-time signal; and provision the one or more communication patterns to implement a communication notification to at least one user means upon the occurrence of an associated real-time signal.

In either of the above embodiments, the call or session specific data further includes a call data record (CDR) or a Per Call Measurement Data (PCMD) record.

In any of the above embodiments, the one or more communications in the telephony communications network further include voice calls, text messages or IP sessions.

In any of the above embodiments the real-time signal further includes a location of the user device or means when a communication is originated, a time of day at which a communication is originated, a day of week on which a communication is originated or a combination.

In an embodiment, the recommendation network element sends at least one communication pattern to a client application on the user device or means.

In a further embodiment, the call or session specific data further includes a phone number of a user device or means receiving the communication.

In another embodiment, the call or session specific data further includes a start time of the communication or a location of the user device or means at the time the communication is originated.

DESCRIPTION OF THE DRAWINGS

Some example embodiments will now be described with reference to the accompanying drawings in which.

DETAILED DESCRIPTION

Telephony communication networks collect usage data to direct communications, such as voice calls and text messages, from a sender to a recipient. Usage data is also used for other purposes within the telephony communication network, such as billing. In order to function, communication networks operate according to well-defined standards that govern voice and data transfer protocols as well as many other aspects of the network. Over time, several different standards have come into use, whether due to improvements in technology or geographic differences. In the discussion below, embodiments will be explained with regard to the 3GPP (3rd Generation Partnership Project) standards, it should be understood that the principles described may be applied to any telephony communication network standard.

Figure 1A:
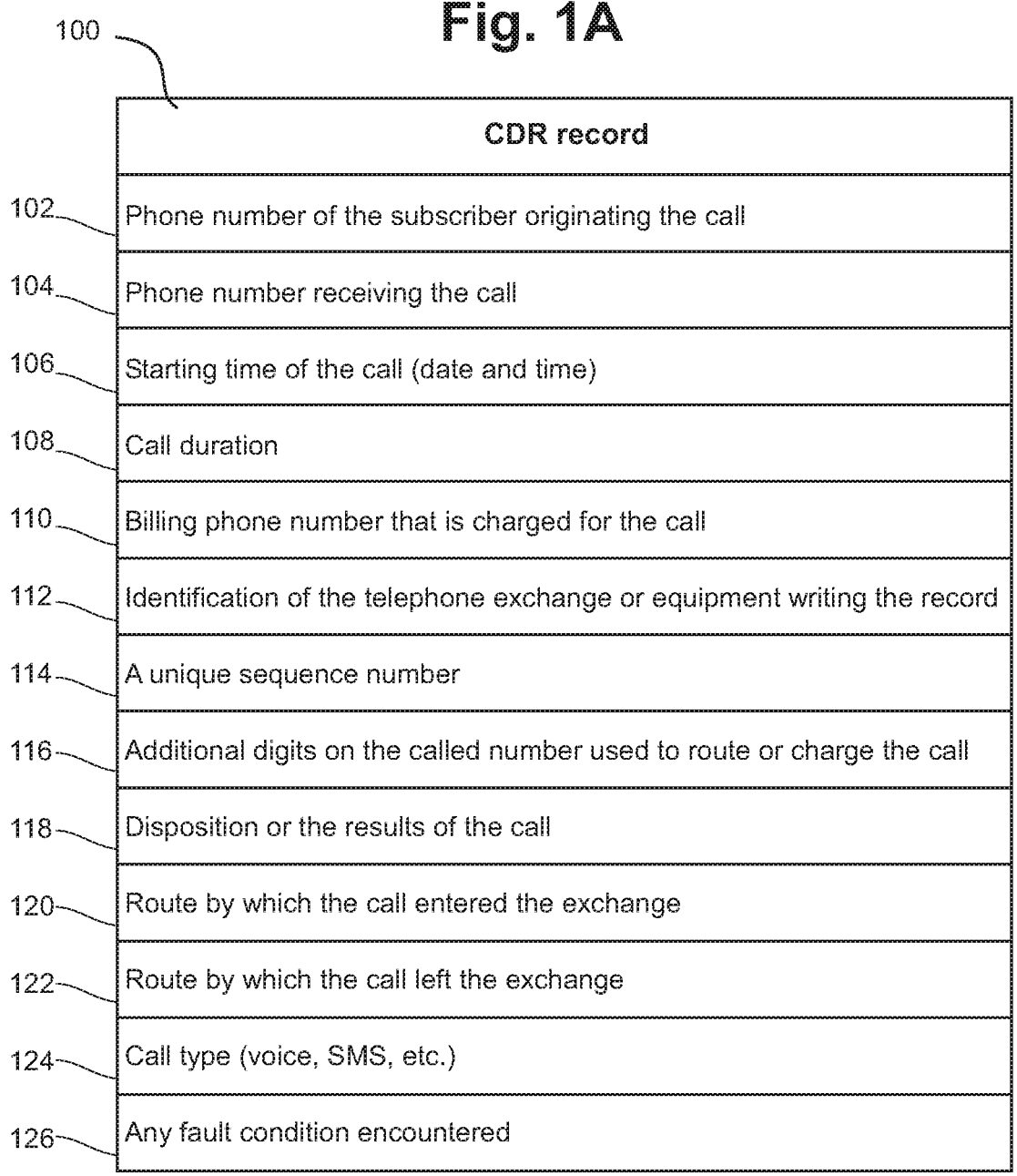
FIG. 1A shows a call data record (CDR) for use in a telephony communication network.

Service providers collect a variety of usage data while processing communications over a network. Communications may include voice calls, text messages or IP sessions, for example. Communications may be originated or terminated by a user device in a variety of ways, including through a key pad, a browser or an application. Call Data Records (CDRs) and Per Call Measurement Data (PCMD) are two types of usage data collected by communication network providers. A representative CDR is illustrated in FIG. 1A. Although specific types of data are listed, a CDR may not include all of the described types or may include additional data to what is specifically listed.

A CDR is generated for each communication initiated on a network. CDR 100 of FIG. 1A includes a phone number 102 of a subscriber originating the call. This may also be referred to as the calling party or A-party. The CDR also includes a phone number 104 of the intended recipient of the call, also known as a called party or B-party. Other data shown in CDR 100 include starting time of the call 106, call duration 108, billing phone number 110 and ID of the telephone exchange or equipment that is writing the record 112. A unique sequence number 114 is generated to identify CDR 100, which may also include additional digits 116 used to route or charge the call and disposition or results 118 of the call, which indicates, for example, whether or not the call was connected. Routing information may be stored as shown in fields 120 and 122. Further a call type 124 indicates if the call was a voice call, a text (SMS or Short Message Service) while field 126 may store information about fault conditions occurring during the call.

Figure 1B:
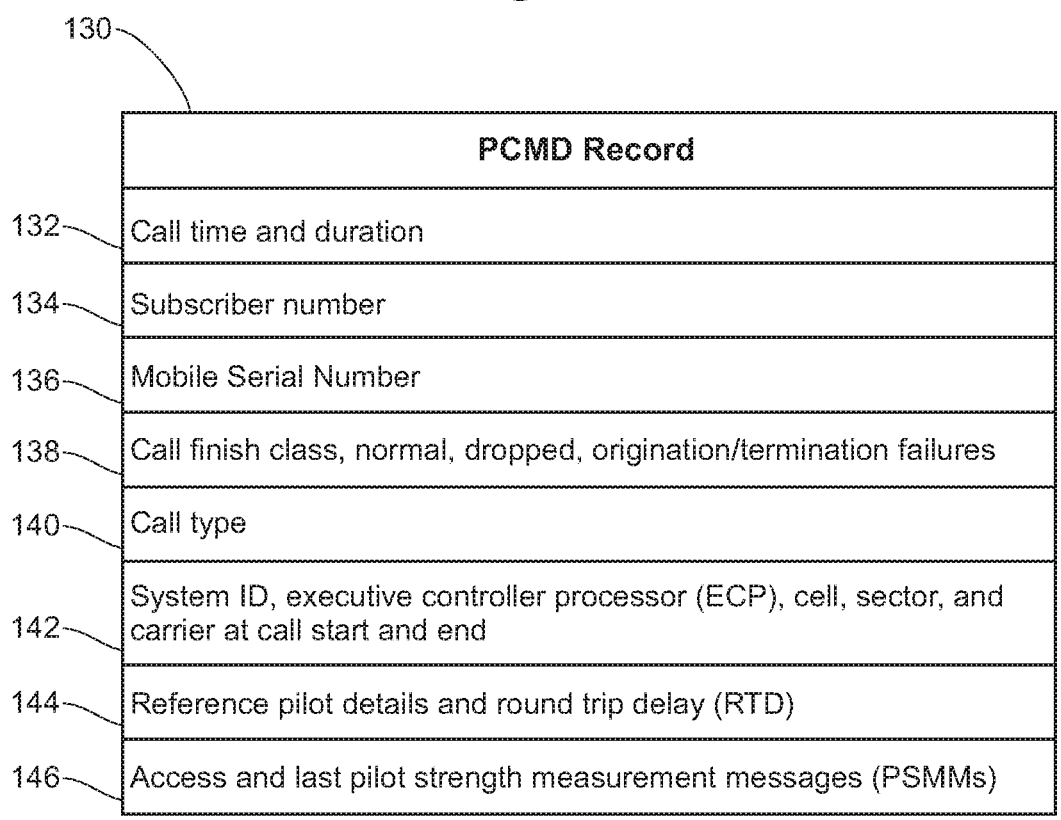
FIG. 1B shows a Per Call Measurement Data (PCMD) record for use in a telephony communication network.

A PCMD record 130 is shown in FIG. 1B. A PCMD record may be understood to store real time diagnostics and troubleshooting tool that offers location data for all active users along with other call/connection information. Typically, PCMD records are generated for a single call/session by the different network elements in the call/session flow and are correlated via post-processing. Although specific types of data are listed in FIG. 1B, a PCMD record may not include all of the described types or may include additional data to what is specifically listed. Information that may be derived from PCMD record 130 includes, for example, call time and duration 132, a subscriber number 134 of the user placing the call and a mobile serial number 136 of the device used to place the call. Information about the completion of the call is stored at 138, for example, if the call finished normally, was dropped, or experienced origination or termination failures. A call type 140 includes, for example, enhanced variable rate coder (EVRC), SMS, or packet data. Field 142 may store information regarding System ID, executive controller processor (ECP), cell, sector, and carrier at call start and end, field 144 may store reference pilot details and round trip delay (RTD) while field 146 may store Access and last pilot strength measurement messages (PSMMs).

Figure 2:
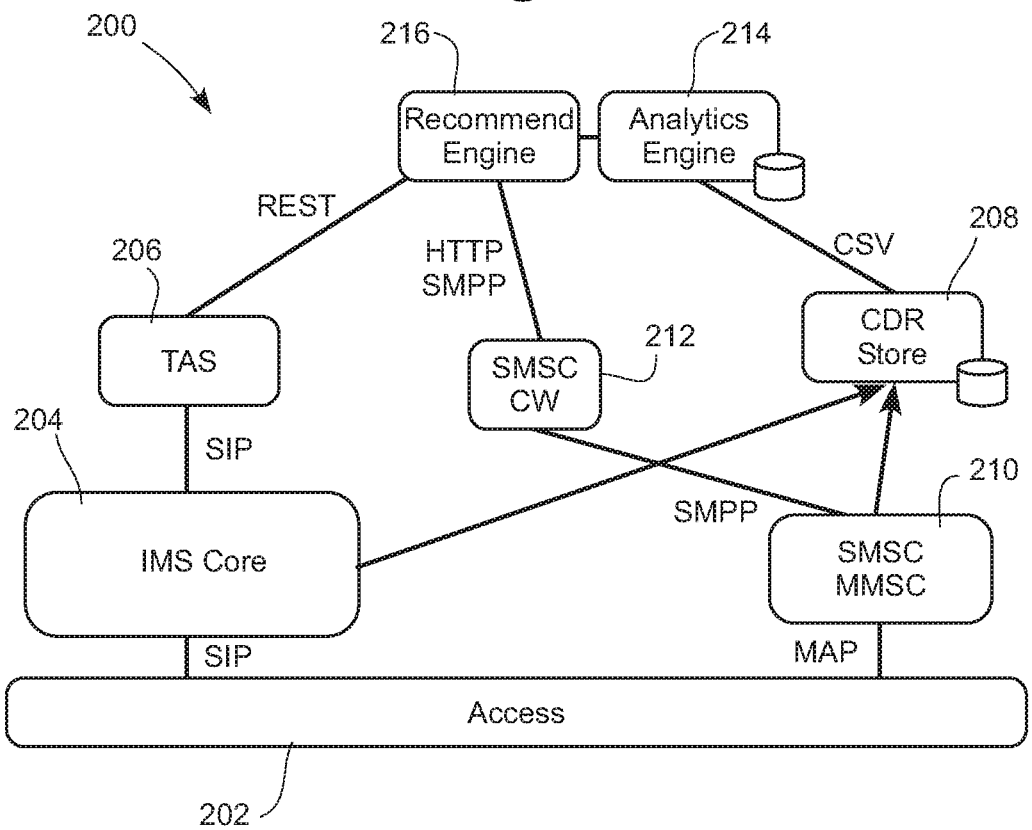
FIG. 2 shows a telephony communication network architecture.

FIG. 2 is a partial architecture of a telephony communication network 200. In particular, FIG. 2 illustrates several network elements. Although specific network elements and communication protocols are discussed, these are representative examples of an embodiment and other network elements and communication protocols may also be used. The functions of the example embodiments may be combined or divided among network elements in a variety of ways as needed for a particular implementation.

Referring to FIG. 2, Access 202 represents any way in which a user device accesses telephony communication network 200. This may include, for example, specific network elements such as a base station, DSL (digital subscriber line), cable modem or, IP (Internet Protocol) Router. Access 202 also encompasses a variety of access technologies such as CDMA (code-division multiple access), GSM (Global System for Mobile communications), GPRS (General Packet Radio Service), WLAN (wireless local area network), WiMAX (Worldwide Interoperability for Microwave Access) or LTE (Long-Term Evolution), etc, used to originate or terminate a communication. A user device may include a mobile phone, tablet, desktop computer or IP phone, for example.

If the communication originated or terminated through Access 202 is a voice call of IP session, a session initiation protocol (SIP) message is sent to IMS (IP Multimedia System) Core 204. This network element represents a variety of components which implement an IMS network, including call set-up, routing and user location services, for example. Some of the components implemented in IMS Core 204 may include HSS/HLR (Home Subscriber Server/Home Location Register) and an S-CSCF (Serving Call State Control Function), for example. IMS Core 204 exchanges further SIP messages with TAS (Telephony Application Server) 206, which is an application server that interacts with the S-CSCF within IMS Core 204 to provide origination and termination voice call control functions, as well as user location services. IMS Core 204 also sends CDR information about the voice call to CDR Store 208. Although shown as a separate element, CDR Store 208 may be included as part of another network element.

If a communication initiated through a user device is a text message, Access 202 may send a Mail Authentication Protocol (MAP) message to Short Message Service Center/Multimedia Message Service Center (SMSC/MMSC) 210. MAP is an SS7 (Signaling System No. 7) protocol used for carrying GSM TPDU's (Transfer Protocol Data Units), which include the short messaging services (SMS) messages. SMSC/MMSC 210 exchanges Short Message Peer to Peer (SMPP) messages with SMSC Gateway (GW) 212. Like IMS Core 204, SMSC/MMSC 210 also sends CDR information about the text message to CDR Store 208. SMSC GW 212 is responsible for routing the text message to a recipient in telephony communication network 200.

In an embodiment, CDR Store 208 sends CDRs to Analytics Engine 214. CDRs may be provided in a .CSV (comma-separated value) file, or any other type of format. Analytics Engine 214 analyzes the CDRs and looks for patterns of communication, such as sending text messages to a spouse upon departing their place of employment every day. Further examples of patterns which may be identified by Analytics Engine 214 include identifying other users who are exchanging calls or texts with the user, the time of day of such communications, the day of week of such communications, the location of where the communications are originated, or access to a website or other application, for example. Communication patterns may be further classified into specific types of use cases, such as a "Communications Check-In", such as a consumer sending a text message to spouse/friend upon departing their place of employment.

Patterns identified by Analytics Engine 214 may be provisioned in Recommendation Engine 216, together with the real-time signals (e.g., location, time of day, day of week) by which a recommendation is to be made to an end user. Recommendation Engine 216 may then use these patterns, along with real-time signals (e.g., location, time of day, day of week) to send notifications to the end-user. These notifications may be sent as SMS messages over HTTP (hypertext transfer protocol) or SMPP to SMSC GW 212. In an alternative embodiment, notifications may be sent as Push notifications for iOS, APNS (Amazon Partner Network) for Android or Google Cloud Messaging (GCM)).

Recommendation Engine 216 may also communicate with TAS 206 using REST (Representational State Transfer) messages to initiate voice calls. For example, if Recommendation Engine 216 has sent a notification suggesting a voice call and an end user has selected "yes," then Recommendation Engine 216 may send a REST request to TAS 206 to initiate the voice call. Alternatively, Recommendation Engine 216 may interact with a client application as described in connection with FIG. 3 to access the dialer on the mobile phone and initiate the call directly via the phone.

In a further embodiment, in addition to specific end-user patterns that can be offered as recommendations, Recommendation Engine 216 may also offer recommendations for general patterns of usage, found in the general population of user voice and text patterns. For example, a recommendation for calling/texting a mother/wife on "Mother's Day." In another embodiment, when a user calls and completes a 911 call while on the road, the completion of this call may trigger Recommendation Engine 216 to send recommendations to call the user's insurance agent, and/or to call emergency contacts. While it is not likely that Analytics Engine 214 would detect this type pattern based on a single user's history of communications, Recommendation Engine 216 may be designed to make such a recommendation based on general patterns of use on telephony communication network 200.

Although Analytics Engine 214 and Recommendation Engine 216 have been shown as two separate network elements, they may also be combined in a single element. In addition, CDR Store 208 may be combined with either or both of Analytics Engine 214 and Recommendation Engine 216.

Figure 3:
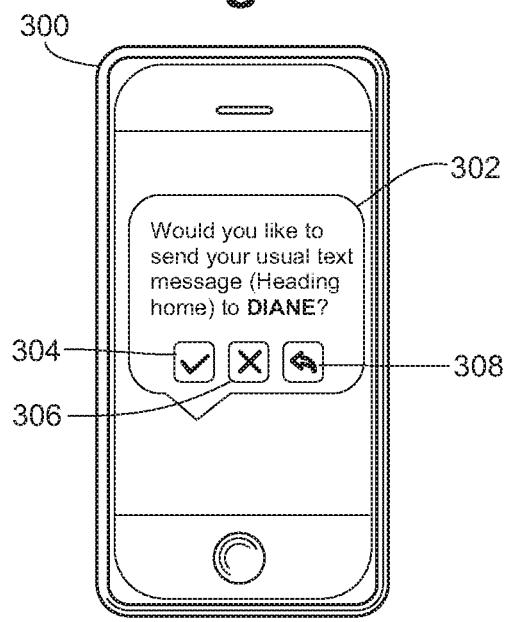
FIG. 3 shows a client application for use on a device communicating with the network of FIG. 2.

In an embodiment, various elements in telephony communication network 200 interact through Access 202 with a client application on a user device 300 as shown in FIG. 3. The client application receives notifications from network 200 and provides them to a user on a display 302 of user device 300. The display may include a variety of menu buttons, for example, a menu button 304 to accept the recommendation and a menu button 306 to reject the recommendation. The client application may also display a menu button 308 to allow the user to defer a notification for some period of time, for example, 10 minutes. If the user selects the accept menu button 304, then the client application will automatically initiate the desired communication which may include, for example, sending a text message or initiating a voice call. In a further embodiment, a text message content may be offered within the recommendation as a typical response based on historical text messages as shown in CDR records in CDR Store 208 (FIG. 2).

Recommendation Engine 116 may also receive information on the which recommendations that the user is accepting, rejecting, or deferring, and include this information in the determination of future recommendations to that end user. Further, the client application may personalize recommendations using a contact list on the user device. In another embodiment, Recommendation Engine 116 may send patterns to the client application on a user device which may generate notifications based on real-time signals.

In another embodiment, Analytics Engine 114 and Recommendation Engine 116 may include the provision of groups, such that one user within a group may give permission (temporarily or permanent) for another user to receive notifications based on triggers resulting from the first user's CDR or PCMD records. Users may opt-in or opt-out of such groups at any time. Some of the situation in which a group functionality may be used include, for example elder-care, child-care, monitoring college students travels to/from colleges and universities, etc.

If used and unless otherwise stated, the terms "upper," "lower," "front," "back," "over," "under," and similar such terms are not to be construed as limiting embodiments to a particular orientation. Instead, these terms are used only on a relative basis.

What is claimed is:

1. A computer-implemented method in a telephony communications network comprising a plurality of network elements, the method comprising:
   receiving call or session specific data associated with at least one user device from one or more network elements, said call or session specific data comprising information about communications in the telephony communications network associated with at least one user device;
   analyzing the call or session specific data to determine one or more communication patterns, wherein the one or more communication patterns are derived from one or more communications, and such one or more communication patterns are associated with a real-time signal; and
   provisioning the one or more communication patterns in a recommendation network element, said recommendation network element using said one or more communication patterns to implement a communication notification to the at least one user device upon an occurrence of the associated real-time signal.

2. The method of claim 1, wherein the call or session specific data further comprises a call data record (CDR) or a Per Call Measurement Data (PCMD) record.

3. The method of claim 1 wherein the one or more communications in the telephony communications network further comprise voice calls, text messages or IP sessions.

4. The method of claim 1 wherein the real-time signal further comprises a location of the user device when a communication is originated.

5. The method of claim 1 wherein the real-time signal further comprises a time of day at which a communication is originated.

6. The method of claim 1 wherein the real-time signal further comprises a day of week on which a communication is originated.

7. The method of claim 1 wherein the real-time signal further comprises a combination of a location, time of day and day of the week.

8. The method of claim 1 wherein the recommendation network element sends at least one communication pattern to a client application on the user device.

9. The method of claim 1 wherein the call or session specific data further comprises a phone number of a user device receiving the communication.

10. The method of claim 1 wherein the call or session specific data further comprises a start time of the communication.

11. The method of claim 1 wherein the call or session specific data further comprises a location of the user device at the time the communication is originated.

12. An apparatus comprising:
   a plurality of telephony communication network elements, said network elements further comprising a non-transitory storage and a processor, said network elements being configured to:
   receive call or session specific data associated with at least one user device, said call or session specific data comprising information about communications in the telephony communications network associated with at least one user device;
   analyze the call or session specific data to determine one or more communication patterns, wherein the one or more communication patterns are derived from one or more communications, and such one or more communication patterns are associated with a real-time signal; and provision the one or more communication patterns in a recommendation network element, said recommendation network element using said one or more communication patterns to implement a communication notification to at least one user device upon the occurrence of an associated real-time signal.

13. The apparatus of claim 12, wherein the call or session specific data further comprises a call data record (CDR) or a Per Call Measurement Data (PCMD) record.

14. The apparatus of claim 12 wherein the one or more communications in the telephony communications network further comprise voice calls, text messages or IP sessions.

15. The apparatus of claim 12 wherein the real-time signal further comprises a location of the user device when a communication is originated.

16. The apparatus of claim 12 wherein the real-time signal further comprises a time of day at which a communication is originated.

17. The apparatus of claim 12 wherein the real-time signal further comprises a day of week on which a communication is originated.

18. The apparatus of claim 12 wherein the real-time signal further comprises a combination of a location, time of day and day of the week.

19. The apparatus of claim 12 wherein the call or session specific data further comprises a phone number of a user device receiving the communication.

20. The apparatus of claim 12 wherein the call or session specific data further comprises a start time of the communication or a location of the user device at the time the communication is originated.

\* \* \* \* \*